(12) United States Patent
Schumann et al.

(10) Patent No.: US 11,644,538 B2
(45) Date of Patent: May 9, 2023

(54) OPTICAL DISTANCE MEASURING APPARATUS AND METHOD FOR OPERATING AN OPTICAL DISTANCE MEASURING APPARATUS

(71) Applicant: OSRAM OLED GmbH, Regensburg (DE)

(72) Inventors: Michael Schumann, Neu-Ulm (DE); Dominik Schulten, Regensburg (DE); Dominik Scholz, Bad Abbach (DE)

(73) Assignee: OSRAM OLED GmbH, Regensburg (DE)

( * ) Notice: Subject to any disclaimer, the term of this patent is extended or adjusted under 35 U.S.C. 154(b) by 573 days.

(21) Appl. No.: 16/626,480

(22) PCT Filed: Jun. 28, 2018

(86) PCT No.: PCT/EP2018/067450
§ 371 (c)(1),
(2) Date: Dec. 24, 2019

(87) PCT Pub. No.: WO2019/002484
PCT Pub. Date: Jan. 3, 2019

(65) Prior Publication Data
US 2020/0158870 A1 May 21, 2020

(30) Foreign Application Priority Data
Jun. 29, 2017 (DE) .......................... 102017114565.6

(51) Int. Cl.
*G01S 7/481* (2006.01)
*G01S 7/484* (2006.01)
(Continued)

(52) U.S. Cl.
CPC ............ *G01S 7/4815* (2013.01); *G01S 7/484* (2013.01); *G01S 7/4816* (2013.01);
(Continued)

(58) Field of Classification Search
None
See application file for complete search history.

(56) References Cited

U.S. PATENT DOCUMENTS 6,038,496 A 3/2000 Dobler et al.
6,504,602 B1 1/2003 Hinderling
(Continued)

FOREIGN PATENT DOCUMENTS

DE 102015122627 A1 12/2016
DE 102017121346 A1 3/2018
EP 3179273 A1 6/2017

*Primary Examiner* — Eileen M Adams
(74) *Attorney, Agent, or Firm* — Slater Matsil, LLP

(57) ABSTRACT

An optical distance measuring device and a method for operating an optical distance measuring device are disclosed. In an embodiment an optical distance measuring device includes a pixelated radiation source with at least two pixels, a radiation detector configured to detect electromagnetic radiation emitted by the radiation source and reflected in measuring regions and a control unit configured to operate the radiation source and to receive electrical signals from the radiation detector, wherein the pixelated radiation source is configured to illuminate different measuring regions with electromagnetic radiation with pairwise different properties.

20 Claims, 3 Drawing Sheets

(51) Int. Cl.
*G01S 7/4863* (2020.01)
*G01S 17/10* (2020.01)
*G01S 17/89* (2020.01)

(52) U.S. Cl.
CPC ............ *G01S 7/4863* (2013.01); *G01S 17/10* (2013.01); *G01S 17/89* (2013.01)

(56) References Cited

U.S. PATENT DOCUMENTS

| | | |
|---|---|---|
| 7,773,204 B1 | 8/2010 | Nelson |
| 2002/0003617 A1 | 1/2002 | Doemens et al. |
| 2005/0184301 A1 | 8/2005 | Nagasaka et al. |
| 2009/0299631 A1 | 12/2009 | Hawes et al. |
| 2012/0013917 A1 | 1/2012 | Ohtomo et al. |
| 2013/0088155 A1 | 4/2013 | Maxik et al. |
| 2013/0101176 A1 | 4/2013 | Park et al. |
| 2015/0238999 A1* | 8/2015 | Al ............................ B05D 1/00 118/712 |
| 2015/0288893 A1* | 10/2015 | Kane ........................ G01J 3/10 348/164 |
| 2017/0062289 A1* | 3/2017 | Von Koblinski ...... B24B 37/042 |
| 2017/0184709 A1* | 6/2017 | Kienzler ............... G01S 7/4865 |
| 2017/0363931 A1* | 12/2017 | Rumpf ................... G02F 1/293 |
| 2018/0059014 A1* | 3/2018 | Ruback ............. H04N 5/23293 |
| 2018/0088215 A1 | 3/2018 | Halbritter et al. |
| 2018/0145211 A1 | 5/2018 | Halbritter et al. |
| 2018/0374981 A1* | 12/2018 | Carr ................. H01L 31/02325 |

\* cited by examiner

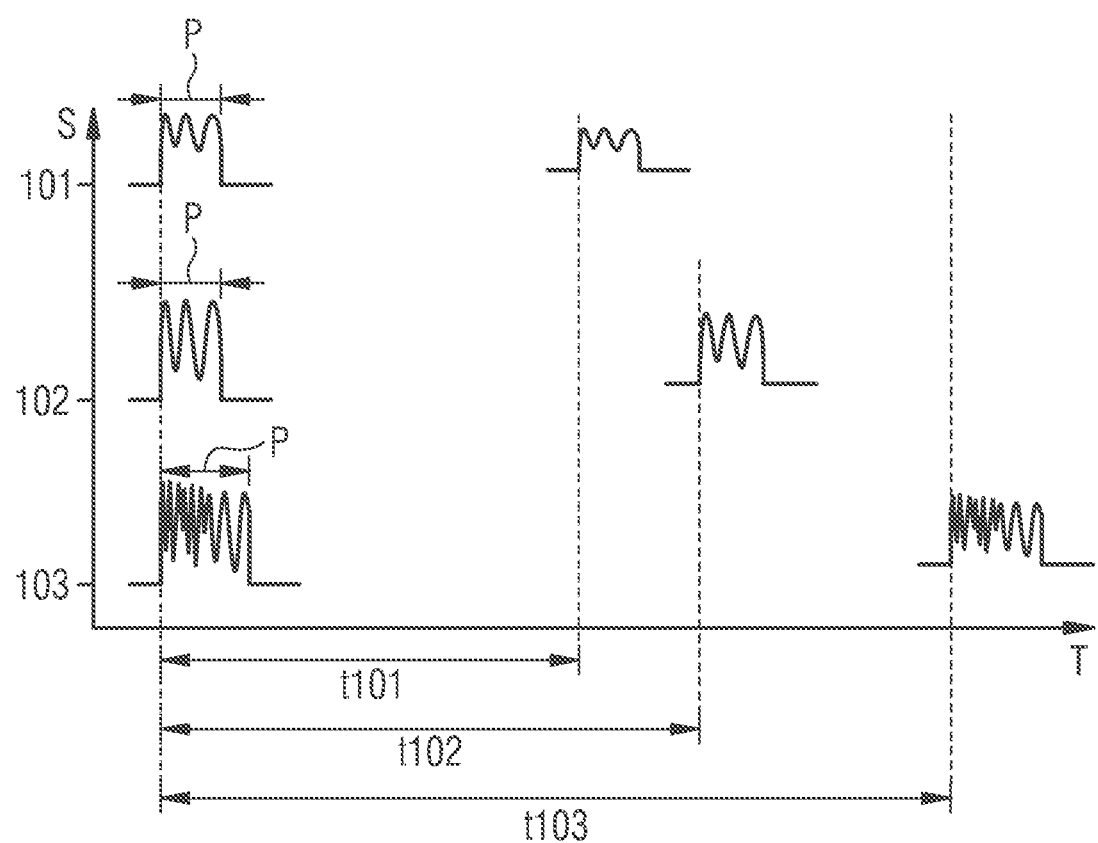

OPTICAL DISTANCE MEASURING APPARATUS AND METHOD FOR OPERATING AN OPTICAL DISTANCE MEASURING APPARATUS

CROSS-REFERENCE TO RELATED APPLICATIONS

This patent application is a national phase filing under section 371 of PCT/EP2018/0674500, filed Jun. 28, 2018, which claims the priority of German patent application 10 2017 114 565.6, filed Jun. 29, 2017, each of which is incorporated herein by reference in its entirety.

TECHNICAL FIELD

An optical distance measuring device is specified. Furthermore, a method for operating an optical distance measuring device is specified.

SUMMARY

Embodiments provide an optical distance measuring device which is particularly space-saving and cost-effective. Further embodiments provide a method of operating such an optical distance measuring device.

The optical distance measuring device is configured to measure one or more distances. In particular, the distance is a distance from a defined point of the distance measuring device to an object, in particular to an area facing the distance measuring device or to a point on an outer surface of an object. For example, a region between the distance measuring device and the object to which the distance is measured is essentially formed by a material having a homogeneous refractive index. In particular, the region between the distance measuring device and the object is formed with a gaseous material, for example, air.

The optical distance measuring device may be configured to measure the distance using electromagnetic radiation. For example, the distance measuring device is configured to generate and emit electromagnetic radiation. Furthermore, the optical distance measuring device may be configured to detect electromagnetic radiation. In particular, electromagnetic radiation emitted by the distance measuring device may be detected by the distance measuring device after a reflection from the object. For example, the distance measuring device is configured to measure a distance by means of a transit time measurement, in particular a so-called time-of-flight measurement.

Furthermore, the optical distance measuring device may be configured to measure a time period. In particular, the time period extends from a point in time at which the distance measuring device emits optoelectronic radiation to a point in time at which the optical distance measuring device detects emitted optoelectronic radiation after reflection from the object. The optical distance measuring device may further be configured to determine at least one distance between the distance measuring device and the object from the measured time period. In particular, the distance measuring device can be used to measure distances with a resolution of less than one meter, preferably less than 0.5 meters.

According to at least one embodiment, the optical distance measuring device comprises a pixelated radiation source with at least two pixels. The pixelated radiation source is configured to generate and emit electromagnetic radiation. For example, the pixelated radiation source comprises one or more light-emitting semiconductor chips.

The pixels of the radiation source are the regions of the radiation source that radiate the electromagnetic radiation during operation. Different pixels of the radiation source may, for example, be formed with different semiconductor chips. Alternatively, at least some pixels of the radiation source may be part of a common semiconductor chip. The semiconductor chip is then divided into at least two pixels.

In particular, the semiconductor chip or the semiconductor chips may be light emitting diodes that generate electromagnetic radiation in the spectral range from infrared radiation to UV radiation.

For example, the pixels are arranged next to each other in a lateral plane at the nodes of a regular grid, for example, a rectangular grating. In particular, the pixels are arranged in such a way that they have a common radiation direction in which the pixels emit electromagnetic radiation during normal operation. The pixels of the radiation source may have been produced in a common manufacturing process. For example, the pixels may be configured to generate and emit electromagnetic radiation from a common color location. This means that the pixels, in particular within a manufacturing tolerance, may emit electromagnetic radiation in the same color location range.

For example, an object region is subordinate to the radiation source in radiation direction. In this context, the object region is a region in which at least one object can be arranged. In particular, the distance measuring device is configured to determine at least one distance between the distance measuring device and a surface of the object facing the distance measuring device. For example, at least one object is not in direct contact with the distance measuring device. For example, the distance measuring device and the object are freely movable relative to each other. For example, the object region is subordinate to the distance measuring device in radiation direction. The object region may be illuminated by means of the radiation source.

Furthermore, the object region can be divided into at least two measuring regions. The measuring regions lie, especially completely, within the object region. In particular, a measuring region is at least part of an outer surface of an object facing the distance measuring device, the object being arranged within the object region. For example, each point on an outer surface of the object facing the distance measuring device is assigned to at least one measuring region within the object region.

According to at least one embodiment of the optical distance measuring device, the optical distance measuring device comprises a radiation detector adapted to detect electromagnetic radiation emitted from the radiation source and reflected in measuring regions. For example, the radiation detector is a photodiode. In particular, the radiation detector may be a CCD sensor or a CMOS sensor. For example, the radiation detector is configured to detect electromagnetic radiation within the wavelength range of the electromagnetic radiation emitted by the radiation source.

In particular, during normal operation of the distance measuring device, at least one object in the object region, to which at least one distance is to be determined, is arranged downstream to the radiation source in the radiation direction. During normal operation, at least part of the electromagnetic radiation emitted by the radiation source may be reflected in the object region, in particular at a surface of the object facing the distance measuring device. At least some of the electromagnetic radiation reflected in the object region may be detectable by the radiation detector. In particular, the radiation detector may be configured to detect only electromagnetic radiation which strikes the radiation detector from the direction of the object region. In particular, the region in which reflected electromagnetic radiation can be detected and the region which can be illuminated by the radiation source are identical.

According to at least one embodiment, the distance measuring device comprises a control unit configured to operate the radiation source and receive electrical signals from the radiation detector. For example, the control unit is an integrated circuit. For example, the control unit is formed with a semiconductor chip. In particular, the control unit may include a microcontroller. For example, the control unit is electrically connected to the radiation source and the radiation detector. In particular, the control unit is configured to control and operate the pixels of the radiation source. In particular, the control unit is configured to receive electrical signals from the radiation detector. Furthermore, the control unit may, for example, include an interface for data transmission. In particular, the interface can be used to transmit measurement data and/or calibration data. The control unit may further be configured to measure time periods. In particular, the control unit is configured to measure time periods with a resolution of less than 0.6 ns, preferably less than 0.3 ns. Advantageously, the control unit may be used to measure the time periods of the transit time of electromagnetic radiation from the emission of the electromagnetic radiation to the detection of the electromagnetic radiation.

For example, the control unit comprises a memory for storing measurement data, calibration data and/or programs for operating the optical distance measuring device. In particular, the speed of propagation of light within different materials can be stored in the memory. For example, data is stored in the control unit that assigns each measuring region a position within the object region and a transmit signal and a receive signal. The position of the measuring region describes the position of the measuring region within the object region. The position is determined, for example, by the arrangement of the pixels of the pixelated radiation source and the projection optic. The transmission signal is, for example, a signal or a plurality of signals with which the radiation source is operated to illuminate a measuring region. The received signal is a signal transmitted to the control unit by the radiation detector. By means of the control unit, for example, each transmitted signal can be uniquely assigned to a received signal. In particular, electromagnetic radiation is generated and emitted on the basis of the transmitted signal by the radiation source, which is then at least partially reflected in the object region and at least partially detected by the radiation detector, wherein the radiation detector outputs the received signal corresponding to the transmitted signal.

The control unit may be configured to measure a time period from the transmission of the transmitted signal to the reception of the received signal corresponding to the transmitted signal. In particular, the control unit is configured to determine from the time period a distance between the distance measuring device and an object in a measuring region in which the electromagnetic radiation was reflected.

According to at least one embodiment, different measuring regions are illuminated with electromagnetic radiation with pairwise different properties. For example, the distance measuring device may be configured to illuminate each measuring region with electromagnetic radiation, whereby electromagnetic radiation with which different measuring regions are illuminated differs in at least one property. In particular, "pairwise different" means that there are no two measuring regions illuminated by electromagnetic radiation with identical properties. In particular, the electromagnetic radiation used to illuminate different measuring region may differ in several properties. In particular, the electromagnetic radiation with which each measuring region is illuminated can be clearly assigned to the measuring region.

For example, different measuring regions may be illuminated with different pixels and/or with different groups of pixels. In particular, the different pixels and/or the different groups of pixels can be configured to emit electromagnetic radiation which differs in at least one property. For example, the object region within a measuring region can be illuminated with electromagnetic radiation with identical properties.

According to at least one embodiment, the optical distance measuring device comprises a pixelated radiation source with at least two pixels, a radiation detector which is configured to detect electromagnetic radiation emitted by the radiation source and reflected in measuring regions, and a control unit which is configured to operate the radiation source and to receive electrical signals from the radiation detector, wherein different measuring regions can be illuminated with electromagnetic radiation with pairwise different properties.

An optical distance measuring device described here may be based, among other things, on the following considerations. A laser scanner, in particular a LIDAR system, can be used to measure a distance between a measuring device and an object region. In this case, a laser is focused in a point-shaped manner and the object region is serially illuminated with the laser via a scanner. The electromagnetic radiation backscattered in the object region is measured by a receiver. The electromagnetic radiation is modulated by the laser. The modulation is used to measure the time the electromagnetic radiation needs to travel from the laser to the object region and back to the radiation detector. The distance of the illuminated measuring region in the object region can be determined by the measuring device via the speed of light known, for example, for air. By scanning the laser over the object region, distance information can be assigned to individual measuring regions. In particular, such a measuring device requires moving components, such as a scanner, and its temporal resolution is limited because the object region is irradiated serially by the laser.

Alternatively, an object region can be illuminated simultaneously with a modulated optical signal using a single light-emitting diode or a single laser. The backscattered radiation from the object region is projected on a camera chip by means of a lens. Due to the two-dimensional resolution of the reflected electromagnetic radiation on the camera chip, it is possible to deduce the distance of individual measuring regions within the object region. Thus, distance information can be assigned to each pixel of the radiation detector. Such a solution requires a particularly light-sensitive camera chip which can detect light with high temporal resolution.

Alternatively, an object region can be uniformly illuminated using a modulated light-emitting diode, which emits electromagnetic radiation in the infrared wavelength range, for example. The radiation scattered back from the object region is measured, for example, by means of a photodiode. The mean distance of the measuring system to the object region can be measured via the transit time of the electromagnetic radiation. With this system, a lateral resolution of individual measuring regions within the object region is not possible.

The distance measuring device described here may makes use, among other things, of the idea of illuminating several measuring regions simultaneously with electromagnetic radiation, each with different properties. By means of a radiation detector, the electromagnetic radiation reflected in the individual measuring regions is detected. Based on the property or combination of properties of the reflected electromagnetic radiation, the reflected electromagnetic radiation can be clearly assigned to a measuring region. Thus, a two-dimensionally resolved distance measurement of spatially separated measuring regions is carried out by means of a pixelated radiation source and a radiation detector. An entire object region can be measured in parallel.

In various embodiments, no mechanically movable components are used, which enables a particularly short measuring time, a particularly high robustness, a high longevity and stability of the distance measuring device. This is particularly important in mobile applications, such as mobile phones. Furthermore, the existing distance measuring device is particularly cost-effective, since complex components such as a laser, a scanner or a time of flight sensor array can be dispensed with. In addition, the distance measuring device has a particularly small size. In particular, the distance measuring device, which, for example, comprises a light emitting diode chip as radiation source, a photodetector chip as radiation detector and a control and evaluation IC chip as control unit, can be realized in a particularly compact way. For example, the distance measuring device can be implemented as an integrated circuit, with integrated photodiode and LED integrated on chip level.

According to at least one embodiment, the pixels are configured to be operated individually by the control unit and the pixels emit electromagnetic radiation with pairwise different properties. In particular, the pixels can be operated by the control unit at different and/or at the same time points. The pixels can be operated by means of the control unit in such a way that they emit electromagnetic radiation with predefinable properties. For example, the pulse width, the amplitude and/or the modulation of the emitted electromagnetic radiation can be adjusted by means of the control unit. In particular, different measuring regions can be illuminated by electromagnetic radiation of different pixels. For example, the measuring regions can each be illuminated with electromagnetic radiation of exactly one pixel. In particular, the electromagnetic radiation emitted by a pixel can be clearly assigned to the pixel and the measuring region by means of its properties. Advantageously, a separate control of individual pixels enables a particularly efficient illumination of individual measuring regions with electromagnetic radiation with singular properties.

According to at least one design, the optical distance measuring device comprises a projection optic. The projection optic is subordinate to the radiation source in a radiation direction. In particular, the projection optic is configured to optically influence electromagnetic radiation emitted by the radiation source. The projection optic, for example, assigns electromagnetic radiation emitted by the radiation source to the measuring regions, whereby the electromagnetic radiation of at least one pixel is assigned to each measuring region. The projection optic is, for example, an objective that comprises at least one lens. For example, at least a majority of the electromagnetic radiation emitted by the radiation source passes through the projection optics.

For example, the projection optic is configured to direct at least a majority of the electromagnetic radiation emitted by the radiation source into the object region. In particular, the projection optic can be configured to image electromagnetic radiation emitted by the radiation source onto the object region. In particular, the projection optic assigns the electromagnetic radiation of at least one pixel to each measuring region. For example, the measuring regions may be arranged next to each other in a lateral direction, perpendicular to the radiation direction of the radiation source. Advantageously, the measuring regions may be illuminated separately by means of the projection optic and separate operation of the pixels of the radiation source.

According to at least one embodiment, the radiation emitted by the pixels is pulse width modulated and comprises different properties with the following parameters: amplitude, frequency, phase and/or pulse duration. For example, the electromagnetic radiation with which different measuring regions are illuminated differs in at least one of these parameters.

For example, the electromagnetic radiation with which different measuring regions are illuminated differs in its amplitude. For example, the electromagnetic radiation with which each measuring region is illuminated has a modulation of the amplitude within a pulse that differs from the modulation of the amplitude of electromagnetic radiation associated with other measuring regions. In particular, the amplitude can be modulated over the course of several successive pulses. For example, the modulation of the amplitude is periodic. In particular, electromagnetic radiation with which different measuring regions are illuminated can have a different periodicity of a modulation of the amplitude.

For example, the electromagnetic radiation with which different measuring regions are illuminated differs in a first frequency. For example, the electromagnetic radiation with which each measuring region is illuminated has a modulation of the first frequency within a pulse which differs from the modulation of the first frequency of electromagnetic radiation assigned to other measuring regions. For example, the frequency at which the first frequency of the electromagnetic radiation is modulated has a maximal value of 10 THz, in particular of 10 GHz MHz. In particular, the frequency at which the first frequency of electromagnetic radiation is modulated has a value of at least 1 kHz. In particular, the first frequency can be modulated over the course of several successive pulses. For example, the modulation of the first frequency is periodic. In particular, electromagnetic radiation with which different measuring regions are illuminated can have a different periodicity of a modulation of the first frequency.

For example, the electromagnetic radiation with which different measuring regions are illuminated differs in its pulse duration. In particular, different measuring regions are illuminated with electromagnetic radiation from the radiation source during different periods of time. In addition, different measuring regions can be illuminated with electromagnetic radiation, which has a different pseudonoise sequence by means of which the electromagnetic radiation can be clearly assigned to a measuring region. A pseudonoise sequence, for example, is a digital signal with statistical properties of random noise. Advantageously, the characteristic in which the electromagnetic radiation with which different measuring regions are illuminated differs can be adjusted by means of the control unit.

In particular, a pixelated radiation source with identical pixels can be used, whereby electromagnetic radiation with different properties can be emitted by at least some pixels.

According to at least one embodiment, the radiation detector comprises a wavelength filter, wherein the wavelength filter at least partially reflects and/or absorbs electromagnetic radiation of a wavelength range different from the wavelength range of the electromagnetic radiation emitted by the radiation source. For example, the radiation source is configured to emit electromagnetic radiation in the visible wavelength range between infrared and UV radiation. In this case, the wavelength filter may have a high transmission for electromagnetic radiation in the blue wavelength range. Alternatively, the radiation source may be configured to emit electromagnetic radiation in the infrared wavelength range. In this case, the wavelength filter may have a high transmission for electromagnetic radiation in the infrared wavelength range. In particular, the wavelength filter may be configured to reflect and/or absorb electromagnetic radiation with a wavelength of less than or equal to 550 nm, in particular less than or equal to 400 nm. Advantageously, the wavelength filter can be used to achieve a particularly good signal-to-noise ratio in the detection of the electromagnetic radiation reflected in the measuring regions.

According to at least one embodiment, the radiation detector comprises a plurality of detection regions arranged side by side in a lateral plane. In particular, the detection regions are arranged in a lateral plane at the nodes of a regular grating, in particular a regular rectangular grating. For example, an objective is used to project at least one measuring region onto the detection regions. In particular, the entire object regions is projected onto the detection regions. For example, the radiation detector is an image sensor formed with silicon. In particular, the radiation detector is a CCD sensor or a CMOS sensor. Advantageously, the radiation detector, which has a large number of detection regions, can be used to measure a particularly high resolution of the measured distances of different measurement regions in a lateral plane. In particular, the radiation detector can be used to detect signals that may also be used to capture an image of at least one measuring region.

According to at least one embodiment, the radiation source is configured to emit electromagnetic radiation in the visible wavelength range, and the radiation detector is configured to detect electromagnetic radiation in the visible wavelength range. In particular, the radiation detector may be configured to receive signals that are used to capture an image. For example, the object region is illuminated by the radiation source so that the electromagnetic radiation reflected in the object region increases the brightness of the captured image. Advantageously, the radiation source may be used as a flash or additional light source of a camera. The radiation detector may furthermore be used as an image sensor of a camera. In particular, the radiation source may be configured to emit electromagnetic radiation in a first wavelength range and the radiation detector may be configured to detect electromagnetic radiation in a second wavelength range. For example, the first wavelength range may be completely within the second wavelength range. Furthermore, the second wavelength range may be larger than the first wavelength range.

According to at least one embodiment, the radiation source is configured to emit electromagnetic radiation in several wavelength ranges. For example, electromagnetic radiation generated by the radiation source is at least partially converted into electromagnetic radiation of another wavelength range by means of a converter. In particular, the radiation source emits electromagnetic radiation which has been partially converted by the converter into electromagnetic radiation of a longer wavelength range. In accordance with the embodiment of the optical distance measuring device, the radiation detector comprises a wavelength filter, wherein the wavelength filter is configured to reflect and/or absorb at least part of the electromagnetic radiation emitted by the radiation source.

For example, the radiation source is configured to illuminate the object region with electromagnetic radiation having a white color location. To generate the light with a white color location, for example, primary radiation in the blue wavelength range is at least partially converted into secondary radiation in the yellow wavelength range by means of a converter. For example, the converter is subordinate to the radiation source in the direction of radiation. In particular, electromagnetic radiation emitted by the radiation source first passes through the converter and then, if necessary, through the projection optic. For example, all electromagnetic radiation emitted by the radiation source first passes through the converter. For example, the wavelength filter may be located on the side of the radiation detector facing the object region. For example, only electromagnetic radiation passing through the wavelength filter can reach the radiation detector. In particular in the case of electromagnetic radiation, which has a modulation of frequency or amplitude, an exclusive detection of the primary radiation is advantageous. One reason for this is that the time delay of the conversion of the emitted light by means of the converter has a negative influence on the signal extraction, since the property of the electromagnetic radiation, on the basis of which the electromagnetic radiation can be clearly assigned to a measuring region, may have a time dependence. If the emission of the electromagnetic radiation is delayed by the conversion or the emission of electromagnetic radiation of different pixels is delayed differently, this can complicate the assignment of the electromagnetic radiation reflected afterwards in individual measuring regions.

According to at least one embodiment, the pixelated radiation source is configured to emit electromagnetic radiation in several wavelength ranges, whereby electromagnetic radiation generated in the radiation source is at least partially converted into electromagnetic radiation of another wavelength range by means of a converter. For example, during normal operation, electromagnetic radiation of a second wavelength range is generated in the radiation source. In particular, at least part of the electromagnetic radiation generated in the radiation source passes through the converter. For example, the converter forms an outer surface of the radiation source in the radiation direction. For example, the converter may be configured to convert electromagnetic radiation of a second wavelength range into electromagnetic radiation of a first wavelength range. In particular, the converter is configured to convert only a part of the electromagnetic radiation passing through the converter into electromagnetic radiation of a first wavelength range. Thus, electromagnetic radiation of at least the first and the second wavelength range can be emitted during normal operation by means of the radiation source.

According to at least one embodiment of the optical distance measuring device, the control unit is configured to determine the mean distance of the measuring regions to the distance measuring device. For example, the control unit is configured to assign the signals detected by the radiation detector to the individual measuring regions. In particular, the control unit is configured to determine the distance of the distance measuring device to the measuring region from the transit time, from the emission of the electromagnetic radiation by means of the radiation source until the detection of the electromagnetic radiation assigned to the measuring region by means of the radiation detector. In particular, the distance measuring device is configured to determine an averaged distance over the area of each measuring region. Advantageously, the optical distance measuring device is a particularly compact and fast system for measuring several distance values to an object region.

In addition, embodiments provide a method of operation an optical distance measuring device. In particular, the method can be used to operate an optical distance measuring device described here. This means that all features disclosed for the optical distance measuring device are also disclosed for the method and vice versa.

According to at least one embodiment of the method of operating an optical distance measuring device, the optical distance measuring device comprises a pixelated radiation source with at least two pixels, a projection optic arranged downstream of the radiation source in a radiation direction, a radiation detector, and a control unit configured to operate the radiation source and receive electrical signals from the radiation detector.

According to at least one embodiment of the method of operating an optical distance measuring device, measuring regions are illuminated with electromagnetic radiation by the radiation source, wherein different measuring regions are illuminated with electromagnetic radiation having pairwise different properties. In particular, the electromagnetic radiation can be clearly assigned to a measuring region on the basis of this property. For example, a measuring region can be illuminated with electromagnetic radiation of one or more pixels. For example, the electromagnetic radiation with which a measuring region is illuminated has a singular property or a singular combination of properties. In particular, the electromagnetic radiation used to illuminate different measuring regions has pairwise different properties, so that the electromagnetic radiation used to illuminate different measuring regions differs in at least one property. For example, no two measuring regions are illuminated with electromagnetic radiation with identical properties.

According to at least one embodiment, at least part of the electromagnetic radiation is reflected in the measuring regions. The electromagnetic radiation can be reflected directionally and/or diffusely scattered at an interface. For example, the electromagnetic radiation is reflected at a surface of an object which has a refractive index different from that of air.

According to at least one embodiment, at least a part of the reflected electromagnetic radiation is detected by the radiation detector. In particular, electromagnetic radiation which is not reflected in a measuring region is not detected by the radiation detector. For example, the radiation detector detects reflected electromagnetic radiation of each measuring region.

According to at least one embodiment, the control unit determines the mean distance of the measuring regions to the distance measuring device. In particular, the control unit determines the distance between the distance measuring device and the measuring regions from the transit time, measured from the emission of the electromagnetic radiation assigned to a measuring region by the radiation source until the detection of the electromagnetic radiation assigned to the measuring region by the radiation detector.

According to at least one embodiment of the method of operating a distance measuring device, the electromagnetic radiation reflected in the measuring regions are clearly assigned to the measuring regions on the basis of their properties. In particular, the electromagnetic radiation reflected in a measuring region can be clearly assigned to at least one pixel of the radiation source. For example, the reflected electromagnetic radiation, which is detected by the radiation detector, can be assigned to a measuring region in the object region and to a pixel of the radiation source. Advantageously, the control unit can be used to calculate the mean distance of a measuring region from the distance measuring device, since the propagation speed of the light in the material located between the distance measuring device and the object region is known and the transit time of the light on the path from the radiation source to the measuring region and to the radiation detector is measured.

According to at least one form of embodiment of the method of operating a distance measuring device, the radiation source is operated by the control unit in such a way that the radiation emitted by the pixels is pulse width modulated and the different properties comprise the following parameters: amplitude, frequency, phase and/or pulse duration. For example, electromagnetic radiation which is assigned to different measuring regions has a different amplitude, in particular a different amplitude modulation, during one or more pulses. In particular, electromagnetic radiation assigned to different measurement ranges may have a different first frequency, in particular a different modulation of the first frequency, during one pulse and/or during several pulses. In particular, electromagnetic radiation assigned to different measuring regions may have a different pulse duration. For example, the reflected electromagnetic radiation can be assigned uniquely to a measuring region and uniquely to at least one pixel of the radiation source on the basis of at least one of the properties and/or a combination of properties. Advantageously, this allows a distance measurement of measuring regions arranged next to each other in a lateral plane.

According to at least one embodiment of the method, a transit time is measured to determine the distance by means of the control unit, wherein the transit time is the time period from the emission of the electromagnetic radiation of a pixel to the detection of the reflected electromagnetic radiation uniquely assigned to the pixel. In particular, the control unit is configured to drive and operate the radiation source so that the radiation source emits electromagnetic radiation at a time which can be predetermined by the control unit. Furthermore, the control unit can be configured to operate the pixels of the radiation source with a predeterminable signal so that the pixels emit electromagnetic radiation with a predeterminable property. Advantageously an integration of the time measurement and the control in the control unit enables a particularly fast and exact distance measurement.

According to at least one embodiment of the method of operating a distance measuring device, several pixels of the radiation source are operated simultaneously. In particular, the emission of the electromagnetic radiation of several pixels takes place simultaneously. For example, the measurement of the time period of several measuring regions, especially of all measuring regions, has a common start time. For example, the distance of the measuring regions is determined at least partially during a common time period. In particular, the distance measurement of different measuring regions is carried out at least partially simultaneously. For example, the distance of different measuring regions is not determined serially. Advantageously, the simultaneous distance measurement of several measuring regions enables a particularly high repetition rate for the distance measurement in the entire object region. This enables, for example, a particularly precise measurement within short periods of time, which is of particular advantage when measuring moving objects.

According to at least one embodiment of the method of operating a distance measuring device, the ambient light is measured by the radiation detector before the measuring regions are illuminated by the radiation source. For example, the ambient light is first measured with the radiation source switched off and the signal detected by the radiation detector is stored. The ambient light signal, which is stored, for example, in a memory in the control unit, is then taken into account during distance measurement using the radiation source. This enables a particularly high signal-to-noise ratio when measuring the distance.

According to at least one embodiment of the method of operating a distance measuring device, the radiation detector comprises a plurality of detection regions and at least one measurement region is projected onto the detection regions by means of an objective. For example, the entire object region is projected onto the detection regions by means of the objective. In particular, the radiation detector can be a silicon-based image sensor. For example, the radiation detector is configured to detect electromagnetic radiation in the visible wavelength range from UV radiation to infrared radiation. For example, the distance measuring device can be integrated into a camera. Advantageously, the plurality of detection regions enables a particularly high resolution of the distance measurement values in a lateral plane, so that different measurement regions can be assigned particularly precisely to a position within the object region.

According to at least one embodiment of the method operating a distance measuring device, the signals detected by the radiation detector are used to capture an image of at least one measuring region and to determine the distance. In particular, the distance information of a measuring region is assigned to a mapping of the measuring region by means of the control unit. Advantageously, the electromagnetic radiation emitted by the radiation source is used to measure the distance is additionally used to increasing the brightness in the object region, so that in the visible wavelength range the object region is sufficiently brightly illuminated to capture an image by means of the detected signals.

BRIEF DESCRIPTION OF THE DRAWINGS

Advantageous embodiments and developments of the distance measuring device and the method of operating a distance measuring device will become apparent from the exemplary embodiments described below in association with the figures.

FIG. 3 shows signal amplitudes of electromagnetic radiation assigned to different pixels of an optical distance measuring device.

In the exemplary embodiments and figures, similar or similarly acting constituent parts are provided with the same reference symbols. The elements illustrated in the figures and their size relationships among one another should not be regarded as true to scale. Rather, individual elements may be represented with an exaggerated size for the sake of better representability and/or for the sake of better understanding.

DETAILED DESCRIPTION OF ILLUSTRATIVE EMBODIMENTS

Figure 1A:
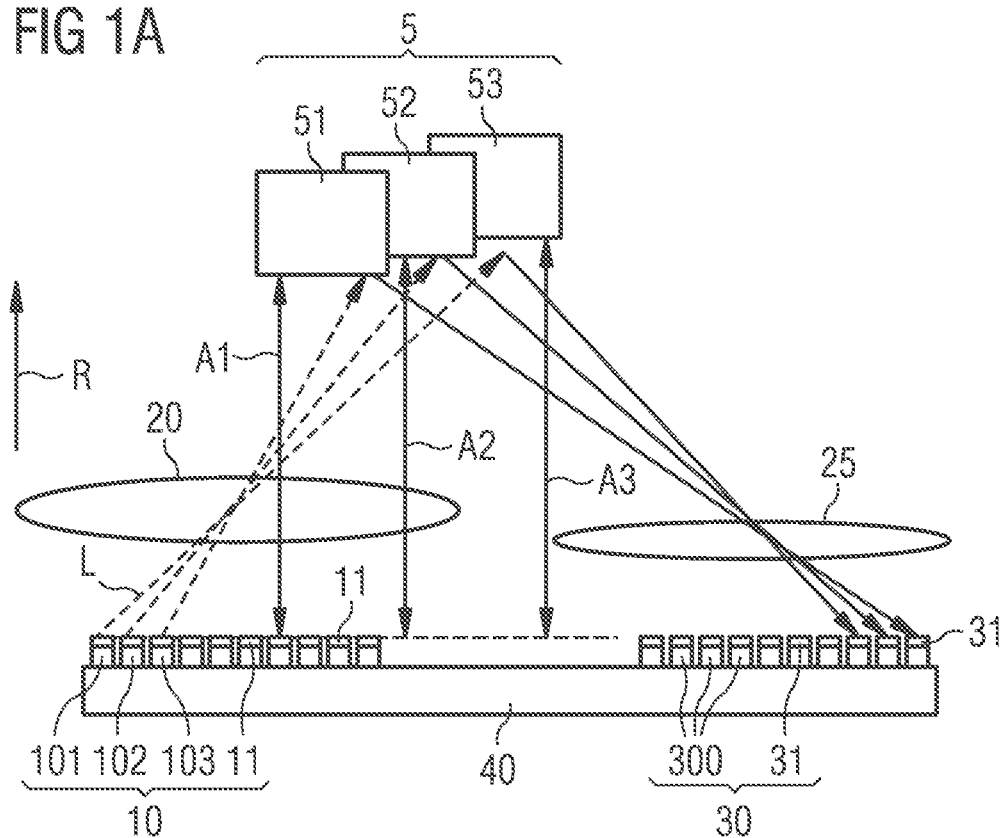
FIGS. 1A and 1B show a schematic sectional view of a distance measuring device.

FIG. 1A shows a schematic sectional view of an optical distance measuring device 1 described here according to a first example. The optical distance measuring device 1 comprises a pixelated radiation source 10 with at least two pixels 101, 102, 103. Further, the optical distance measuring device comprises a radiation detector 30 which is configured to detect electromagnetic radiation L emitted from the radiation source 10 and reflected in measuring regions 51, 52, 53. Further, the optical distance measuring device 1 comprises a control unit 40 configured to operate the radiation source 10 and to receive electrical signals from the radiation detector 30, wherein the pixels 101, 102, 103 are each individually operable by the control unit 40. For example, each measuring region 51, 52, 53 is illuminated with electromagnetic radiation which differs at least in one property by means of the radiation source. In particular, pixels 101, 102, 103 emit electromagnetic radiation L with pairwise different properties.

A projection optic 20 is subordinate to the radiation source 10 in a radiation direction R. The projection optic 20 is configured to assign electromagnetic radiation L emitted by the radiation source to the measuring regions 51, 52, 53. Each measuring region 51, 52, 53 is assigned the electromagnetic radiation L of at least one pixel 101, 102, 103. In particular, electromagnetic radiation L of several pixels 101, 102, 103 can be assigned to a common measuring region 51, 52, 53 by means of projection optics. In the measuring regions 51, 52, 53 the electromagnetic radiation L is at least partially reflected. At least part of the reflected electromagnetic radiation L is detected by the radiation detector 30. Electromagnetic radiation L, which is assigned to different measuring regions 51, 52, 53, has at least one different property. Based on this property, the reflected electromagnetic radiation L can be uniquely assigned to a measuring region 51, 52, 53 in object region 5.

The radiation L emitted by the pixels 101, 102, 103 is pulse width modulated and the different properties include the following parameters: amplitude, frequency, phase and/or pulse duration. For example, the radiation source 10 is configured to emit electromagnetic radiation L in the visible wavelength range, and the radiation detector 30 is configured to detect electromagnetic radiation L in the visible wavelength range.

The radiation detector comprises a plurality of detection regions 300 arranged side by side in a lateral plane. In particular, the radiation detector is a CMOS sensor or CCD sensor. Further, the radiation detector 30 comprises a wavelength filter 31, wherein the wavelength filter 31 at least partially reflects and/or absorbs electromagnetic radiation L of a wavelength range different from the wavelength range of the electromagnetic radiation L emitted by the radiation source 10. The distance measuring device further comprises an objective 25 configured to configured the object region 5 onto the radiation detector 30.

For example, the control unit 40 is cohesively connected to the radiation source 10 and/or the radiation detector 30. The radiation source, the radiation detector and the control unit can be partially or completely integrated in a common chip. For example, the chip is a semiconductor chip that implements a control and evaluation function. In particular, the radiation detector is integrated in the control unit and a pixelated light emitting diode is arranged on the control unit.

Figure 1B:
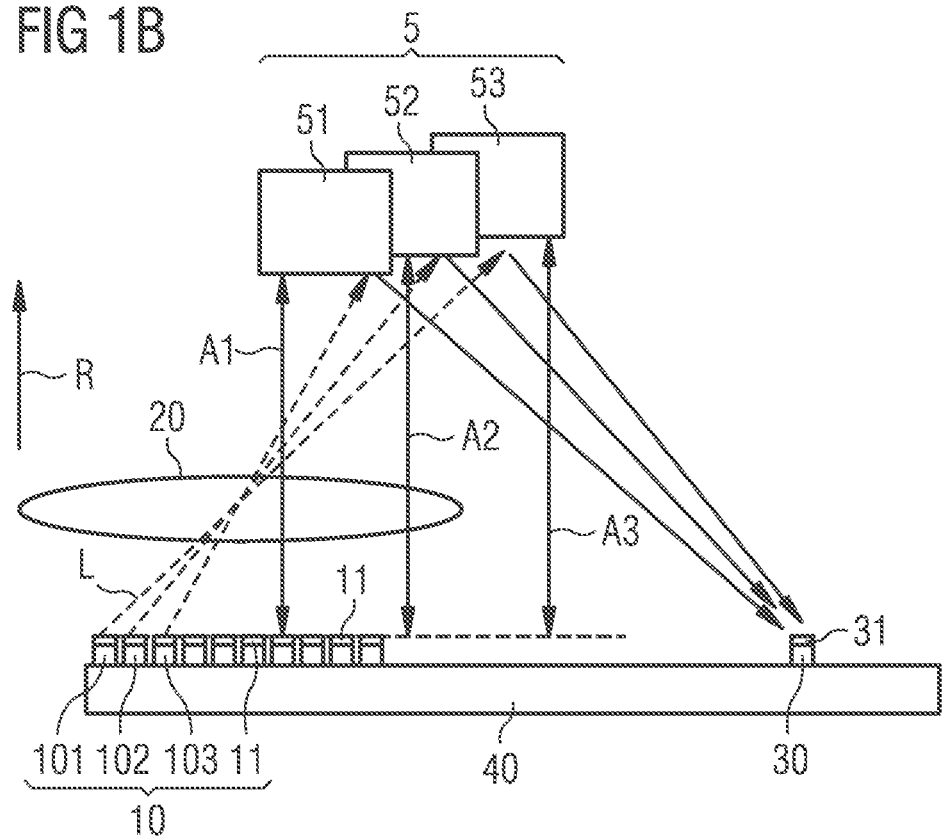

FIG. 1B shows a schematic sectional view of an optical distance measuring device 1 according to a second example. The distance measuring device 1 comprises a pixelated radiation source 10 with at least two pixels 101, 102, a projection optic 20 which is arranged downstream of the radiation source 10 in radiation direction R, a radiation detector 30 and a control unit 40. The control unit is configured to operate the radiation source 10 and to receive electrical signals from the radiation detector 30. The radiation source is used to illuminate 10 different measuring regions 51, 52, 53 with electromagnetic radiation L with pairwise different properties. In particular, the pixels 101, 102, 103 can emit electromagnetic radiation L with pairwise different properties. The projection optics 20 assign each measuring region 51, 52, 53 electromagnetic radiation L of at least one pixel 101, 102, 103. At least a part of the electromagnetic radiation L is reflected in the measuring regions 51, 52, 53. At least a part of the reflected electromagnetic radiation is detected by the radiation detector 30 and by the control unit 40 the mean distance A1, A2, A3 of the measuring regions 51, 52, 53 to the distance measuring device 1 is determined.

The electromagnetic radiation L reflected in the measuring regions 51, 52, 53 can be uniquely assigned to the measuring regions 51, 52, 53 on the basis of its properties. In contrast to the first example, the radiation detector 30 does not comprise several detection ranges 300, but exactly one detection range, which is designed to detect electromagnetic radiation L emitted by the radiation source 10 after reflection in the measurement regions 51, 52, 53. In particular, the radiation detector 30 comprises exactly one photodiode with which at least part of the electromagnetic radiation L reflected in the measuring regions 51, 52, 53 is detected.

The control unit 40 is configured to measure a transit time. The transit time is the period of time from the emission of the electromagnetic radiation L for the illumination of a measuring region 51, 52, 53 until the detection of the reflected electromagnetic radiation L which can be clearly assigned to the measuring region 51, 52, 53. The control unit 40 is configured to control and operate the pixels 101, 102, 103 of the radiation source 10. In particular, the control unit may be used to define the property in which the electromagnetic radiation with which different measuring regions are illuminated differs. The property in which the electromagnetic radiation differs, which is assigned to different measuring regions 51, 52, 53, includes one of the following parameters: amplitude, frequency, phase and/or pulse duration. On the basis of this property, the electromagnetic radiation L reflected in the measuring regions 51, 52, 53 can be assigned to a measuring region 51, 52, 53 in which the electromagnetic radiation L was reflected by means of the radiation detector 30.

In normal operation, for example, the ambient light is first measured by means of the radiation detector 30 before the measuring regions 51, 52, 53 are illuminated by the radiation source 10. The measured value for the ambient light is stored in a memory of the control unit and then taken into account when evaluating the received signal transmitted by the radiation detector. This advantageously increases the signal-to-noise ratio when detecting the reflected electromagnetic radiation.

Figure 2A:
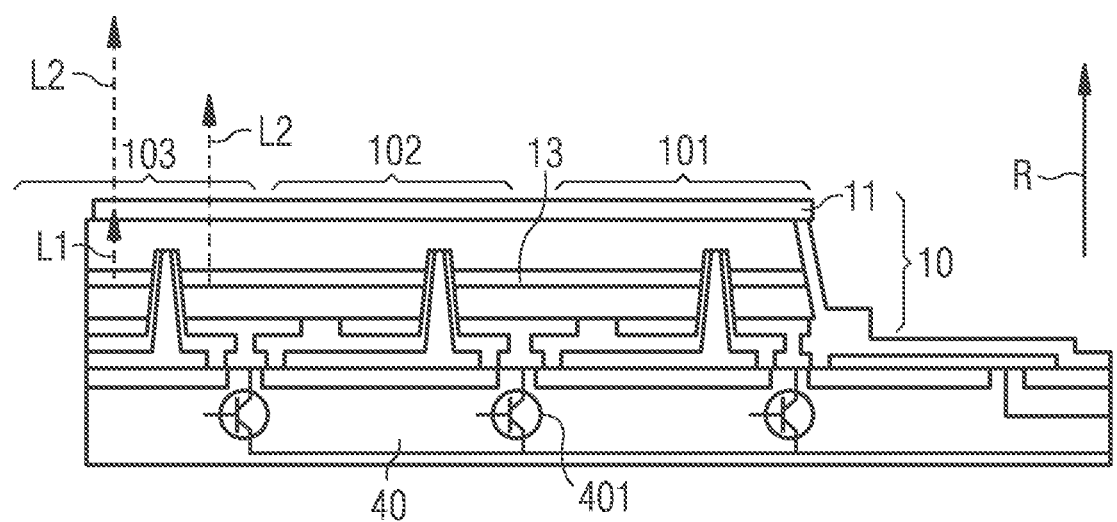
FIGS. 2A and 2B show a schematic sectional view of a radiation source of a distance measuring device.

FIG. 2A shows a schematic sectional view of a first example of a pixelated radiation source 10 and a control unit 40 of a distance measuring device 1. The radiation source 10 comprises a first pixel 101, a second pixel 102 and a third pixel 103, which can be operated separately from each other. For example, the first pixel 101, the second pixel 102, and the third pixel 103 are part of a common semiconductor chip manufactured by a common manufacturing process, such as epitaxy. The pixels 101, 102, 103 comprise an active region 13, which can be contiguous, for example. In particular, individual pixels can be operated separately by means of selective local current imprinting in the active area.

Alternatively, the active region of 13 different pixels 101, 102, 103 may not be contiguous. For example, at least the active region between adjacent pixels 101, 102, 103 can be separated. The radiation source 10 is arranged on a control unit 40, by means of which the pixels 101, 102, 103 are controlled and operated separately from each other. The control unit 40 includes among other things transistors 401, by means of which the pixels 101, 102, 103 can be switched on and off individually. In radiation direction R, converters 11 are subordinate to the pixels 101, 102, 103. The converters are each configured to convert at least part of the electromagnetic radiation L generated within the active region 13 into radiation of a longer wavelength range.

For example, the radiation source 10 is arranged to generate primary radiation L1 in a first, for example blue, wavelength range, wherein at least a part of the primary radiation L1 is converted by the converter 11 into secondary radiation L2 in a second wavelength range, for example yellow wavelength range. In particular, such a radiation source 10 can be used in combination with a radiation detector 30 comprising a wavelength filter 31 which is at least partially reflective and/or absorbing for secondary radiation L2. Advantageously, such a radiation source 10 can be arranged to illuminate the object region 5 with optoelectronic radiation L of a white color location, whereby exclusively reflected electromagnetic radiation L of a predeterminable wavelength range is detected.

Figure 2B:
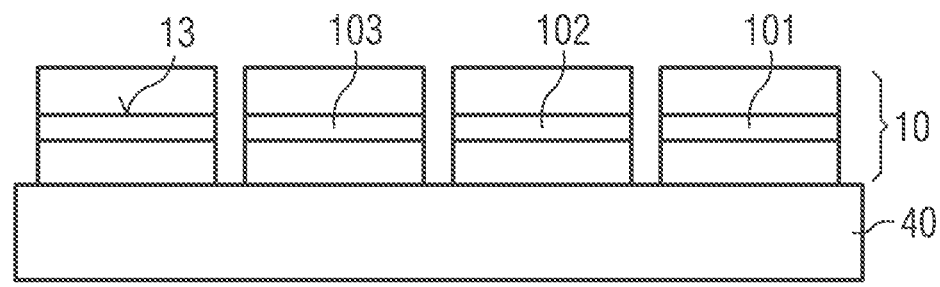

FIG. 2B shows a sectional view of a radiation source 10 and a control unit 40 of an optical distance measuring device according to a second example. In contrast to the example shown in FIG. 2A, the radiation source 10 comprises several pixels 101, 102, 103 which are not contiguous. In particular, the pixels 101, 102, 103 may be produced by different manufacturing processes. The pixels 101, 102, 103 can be operated separately from each other and are each electrically conductively connected to the control unit 40. The pixels 101, 102, 103 each have an active region 13 in which electromagnetic radiation L is generated during normal operation. The radiation source 10 is cohesively connected to the control unit 40 so that the mechanical connection between the radiation source 10 and the control unit 40 can only be released by destroying the control unit 40 or the radiation source 10.

FIG. 3 shows a signal amplitude S of electromagnetic radiation L emitted by different pixels 101, 102, 103, which is detected by the radiation detector 30 after a time T. To determine the distance A, the control unit 40 operates the radiation source 10 in such a way that the first pixel 101, the second pixel 102 and the third pixel 103 emit electromagnetic radiation L, which differs in at least one property. The electromagnetic radiation L of the first pixel 101, the second pixel 102 and the third pixel 103 is assigned to 20 different measuring regions 51, 52, 53 by means of a projection optic 20. Due to the different properties, the electromagnetic radiation L can be clearly assigned to the individual measuring regions 51, 52, 53 in object region 5 and to the individual pixels 101, 102, 103. By means of the radiation detector 30 at least a part of the electromagnetic radiation L reflected in the measuring regions 51, 52, 53 is detected. By means of the control unit, the transit time of the signal of the first pixel t101, the transit time of the signal of the second pixel t102 and the transit time of the signal of the third pixel t103 are measured. The transit time of the signal of the first pixel t101 is measured from the emission of the electromagnetic radiation L by means of the first pixel 101 until the detection of the electromagnetic radiation L reflected in the object region 5 by means of the radiation detector 30. In the same way, the transit time of the electromagnetic radiation L emitted by the second pixel 102 and by the third pixel 103 is measured.

The emitted electromagnetic radiation L of the first pixel 101, the second pixel 102 and the third pixel 103 differ in the modulation of the first frequency, the phase, the modulation of the amplitude A and/or the pulse width P. In particular, the reflected electromagnetic radiation L can be clearly assigned to the individual pixels 101, 102, 103 and the individual measuring regions 51, 52, 53 on the basis of these properties. In particular, the modulation can be a pseudonoise sequence by means of which the electromagnetic radiation L assigned to a measuring region 51, 52, 53 can be uniquely assigned to the measuring region 51, 52, 53. The detected electromagnetic radiation L has a smaller amplitude S than the emitted electromagnetic radiation L.

The invention is not restricted to the exemplary embodiments by the description on the basis of said exemplary embodiments. Rather, the invention encompasses any new feature and also any combination of features, which in particular comprises any combination of features in the patent claims and any combination of features in the exemplary embodiments, even if this feature or this combination itself is not explicitly specified in the patent claims or exemplary embodiments.

The invention claimed is:

1. An optical distance measuring device comprising:
   a pixelated radiation source configured to emit electromagnetic radiation, the pixelated radiation source having at least two pixels;
   a radiation detector configured to detect the electromagnetic radiation emitted by the radiation source and reflected in measuring regions;
   a control unit configured to operate the radiation source and to receive electrical signals from the radiation detector; and
   a projection optic,
   wherein the pixelated radiation source is configured to illuminate different measuring regions with the electromagnetic radiation with pairwise different properties,
   wherein the optical distance measuring device is configured to measure at least one distance of the optical distance measuring device to at least one measuring region
   wherein the projection optic is arranged downstream of the pixelated radiation source in a radiation direction,
   wherein the projection optic is configured to assign the electromagnetic radiation emitted by the pixelated radiation source to the measuring regions, and
   wherein each measuring region is assigned to electromagnetic radiation of at least one pixel.

2. The optical distance measuring device according to claim 1, wherein the control unit is configured to individually operate the pixels of the pixelated radiation source, and wherein the pixels are configured to emit the electromagnetic radiation with pairwise different properties.

3. The optical distance measuring device according to claim 1, wherein the electromagnetic radiation emitted by the pixels is pulse width modulated and the different properties comprise amplitude, frequency, phase and/or pulse duration.

4. The optical distance measuring device according to claim 1, wherein the radiation detector comprises a wavelength filter, wherein the wavelength filter is configured to at least partially reflect and/or absorb electromagnetic radiation of a wavelength range different from the wavelength range of the electromagnetic radiation emitted by the pixelated radiation source.

5. The optical distance measuring device according to claim 1, wherein the radiation detector comprises a plurality of detection regions arranged side by side in a lateral plane.

6. The optical distance measuring device according to claim 1,
   wherein the pixelated radiation source is configured to emit the electromagnetic radiation in a visible wavelength range, and
   wherein the radiation detector is configured to detect the electromagnetic radiation in the visible wavelength range.

7. The optical distance measuring device according to claim 1,
   wherein the pixelated radiation source is configured to emit the electromagnetic radiation in a plurality of wavelength ranges,
   wherein the radiation detector comprises a wavelength filter, and
   wherein the wavelength filter is configured to reflect and/or absorb at least part of the electromagnetic radiation emitted by the pixelated radiation source.

8. The optical distance measuring device according to claim 7, wherein a converter is configured to at least partially convert the electromagnetic radiation generated in the radiation source into electromagnetic radiation of another wavelength range.

9. The optical distance measuring device according to claim 1, wherein the control unit is configured to determine a mean distance of the measuring regions from the optical distance measuring device.

10. A method for operating an optical distance measuring device for measuring a distance of a transit time of electromagnetic radiation, wherein the optical distance measuring device includes a pixelated radiation source with at least two pixels, a projection optic arranged downstream of the radiation source in a radiation direction, a radiation detector, and a control unit configured to operate the radiation source and to receive electrical signals from the radiation detector, and wherein the radiation source comprises at least one semiconductor chip and at least some pixels of the radiation source are part of a common semiconductor chip, the method comprising:
    illuminating different measuring regions with the electromagnetic radiation with pairwise different properties;
    reflecting at least part of the electromagnetic radiation in the measuring regions;
    detecting at least part of reflected electromagnetic radiation by the radiation detector; and
    determining a mean distance between each of the measuring regions and the optical distance measuring device by the control unit by measuring a time period from transmission of a transmitted signal to reception of a received signal corresponding to the transmitted signal,
    wherein a measurement of the time periods of several measuring regions has a common starting time.

11. The method according claim 10, wherein the electromagnetic radiation reflected in the measuring regions is uniquely assigned to the measuring regions on basis of its properties.

12. The method according to claim 10, further comprising operating the pixelated radiation source by the control unit such that the electromagnetic radiation emitted by the pixels is pulse width modulated and the different properties comprise an amplitude, a frequency, a phase and/or a pulse duration.

13. The method according to claim 10, wherein determining the mean distance comprises measuring a transit time by the control unit, wherein the transit time is the time period from an emission of the electromagnetic radiation of a pixel to a detection of the reflected electromagnetic radiation which is uniquely assigned to the pixel.

14. The method according to claim 10, wherein a plurality of pixels of the pixelated radiation source is operated simultaneously.

15. The method according to claim 10, further comprising measuring an ambient by the radiation detector before illuminating the measuring regions by the pixelated radiation source.

16. The method according claim 10, wherein the radiation detector comprises a plurality of detection regions, and wherein at least one measuring region is projected onto the detection regions by an objective.

17. The method according to claim 16, wherein the signals detected by the radiation detector are used to capture an image of at least one measuring region and to determine the distance.

18. An optical distance measuring device comprising:
a pixelated radiation source with at least two pixels, wherein the radiation source comprises at least one semiconductor chip and at least some pixels of the radiation source are part of a common semiconductor chip, wherein the pixels of the pixelated radiation source comprise a contiguous active region, wherein the pixels are separately operable, and wherein the pixelated radiation source is configured to illuminate different measuring regions with electromagnetic radiation with pairwise different properties;
a radiation detector configured to detect the electromagnetic radiation emitted by the radiation source and reflected in the measuring regions; and
a control unit configured to:
operate the radiation source and to receive electrical signals from the radiation detector, and
measure a time period from transmission of a transmitted signal to a reception of a received signal corresponding to the transmitted signal, wherein a measurement of the time period of several measuring regions has a common starting time.

19. The optical distance measuring device according to claim 18,
wherein the pixelated radiation source is configured to emit the electromagnetic radiation in a visible wavelength range, and
wherein the radiation detector is configured to detect the electromagnetic radiation in the visible wavelength range.

20. The optical distance measuring device according to claim 18,
wherein the pixelated radiation source is configured to emit the electromagnetic radiation in a plurality of wavelength ranges,
wherein the radiation detector comprises a wavelength filter, and
wherein the wavelength filter is configured to reflect and/or absorb at least part of the electromagnetic radiation emitted by the pixelated radiation source.

* * * * *